United States Patent
Ikemoto et al.

(10) Patent No.: US 6,838,141 B2
(45) Date of Patent: Jan. 4, 2005

(54) HOSE

(75) Inventors: Ayumu Ikemoto, Komaki (JP); Motoshige Hibino, Komaki (JP); Hidehito Ikeda, Kasugai (JP); Kazutaka Katayama, Komaki (JP)

(73) Assignee: Tokai Rubber Industries, Ltd., Komaki (JP)

(*) Notice: Subject to any disclaimer, the term of this patent is extended or adjusted under 35 U.S.C. 154(b) by 158 days.

(21) Appl. No.: 10/222,890

(22) Filed: Aug. 19, 2002

(65) Prior Publication Data

US 2003/0124284 A1 Jul. 3, 2003

(30) Foreign Application Priority Data

Sep. 4, 2001 (JP) ......................... 2001-267703
Sep. 4, 2001 (JP) ......................... 2001-267704

(51) Int. Cl.$^7$ ............... B32B 1/08; B32B 15/06; B32B 15/08; F16L 11/04; F16L 11/20
(52) U.S. Cl. ............... 428/36.91; 428/35.7; 428/35.8; 428/35.9; 428/36.6; 428/36.7; 428/461; 428/458; 428/476.1; 428/476.3; 428/476.9; 428/523; 138/118; 138/124; 138/125; 138/126; 138/127; 138/131; 138/133; 138/134; 138/137; 138/138; 138/139; 138/141; 138/143; 138/DIG. 4; 138/DIG. 7; 138/DIG. 10
(58) Field of Search ............... 428/35.7, 35.8, 428/35.9, 36.6, 36.7, 36.91, 461, 462, 458, 476.1, 476.3, 476.9, 523; 138/118, 124, 125, 126, 127, 131, 133, 134, 137, 138, 139, 141, 143, DIG. 4, DIG. 7, DIG. 10

(56) References Cited

U.S. PATENT DOCUMENTS

| | | | | |
|---|---|---|---|---|
| 4,559,973 A | | 12/1985 | Hane et al. ................. 138/138 |
| 4,633,912 A | | 1/1987 | Pilkington et al. .......... 138/132 |
| 4,758,455 A | * | 7/1988 | Campbell et al. .......... 428/35.9 |
| 5,271,977 A | * | 12/1993 | Yoshikawa et al. ........ 428/35.9 |
| 5,476,121 A | * | 12/1995 | Yoshikawa et al. ......... 138/138 |
| 6,074,717 A | * | 6/2000 | Little et al. ................ 428/35.7 |
| 6,213,155 B1 | * | 4/2001 | Furuta et al. ............... 138/123 |
| 6,237,641 B1 | * | 5/2001 | Niki et al. .................. 138/126 |
| 6,279,615 B1 | * | 8/2001 | Iio et al. ..................... 138/137 |
| 6,619,329 B2 | * | 9/2003 | Ikemoto et al. ............. 138/126 |

FOREIGN PATENT DOCUMENTS

| EP | 1195244 A1 | 4/2002 |
|---|---|---|
| JP | 2002-179861 | 6/2002 |
| JP | 2002-181249 | 6/2002 |

OTHER PUBLICATIONS

European Search Report dated Feb. 27, 2003.

* cited by examiner

Primary Examiner—William P. Watkins, III
Assistant Examiner—Chris Bruenjes
(74) Attorney, Agent, or Firm—Armstrong, Kratz, Quintos, Hanson & Brooks, LLP

(57) ABSTRACT

A hose of a laminated structure which comprises a rubber layer composed of a rubber composition, and a laminate including a metal foil and a resin, the rubber composition including:
- (A) a rubber including at least one of an ethylene-propylene-diene terpolymer and an ethylene-propylene copolymer;
- (B) a peroxide vulcanizing agent;
- (C) a resorcinol compound; and
- (D) a melamine resin.

The hose is light in weight, less costly, and has excellent gas barrier properties.

17 Claims, 1 Drawing Sheet

HOSE

BACKGROUND OF THE INVENTION

1. Field of the Invention

The present invention relates to a hose and, more specifically, to a hose for automotive use, for example, for use as a methanol fuel hose or a hydrogen fuel hose in a fuel cell vehicle or a hose for transporting coolant in an air conditioner.

2. Description of the Art

Motor vehicles employing a methanol fuel (which may contain a gasoline) or a hydrogen fuel have not come into practical use, so that hoses for use in such motor vehicles have not specifically been developed. However, attempts are actively made to equip next-generation automotive systems with fuel batteries employing a methanol fuel or a hydrogen fuel, and there is an increasing demand for developing hoses such as a methanol fuel hose and a hydrogen fuel hose for use in fuel cell vehicles.

Metal tubes such as of stainless steel (SUS) are currently employed as fuel tubes (e.g., methanol fuel tubes and hydrogen fuel tubes) for fuel cell prototype vehicles preproduced by automotive makers in consideration of gas resistance (resistance to degradation by gas) and gas barrier properties (impermeability to methanol and hydrogen). However, the metal tubes (e.g., SUS tubes) are very heavy in weight, poor in fuel efficiency, and costly.

In view of the foregoing, it is an object of the present invention to provide a hose which is superior in gas barrier property, light in weight and less costly.

SUMMARY OF THE INVENTION

In accordance with the present invention to achieve the aforesaid objects, there is provided a hose of a laminated structure which comprises a rubber layer composed of a rubber composition, and a laminate comprising a metal foil and a resin, the rubber composition comprising:

(A) a rubber comprising at least one of an ethylene-propylene-diene terpolymer and an ethylene-propylene copolymer;
(B) a peroxide vulcanizing agent;
(C) a resorcinol compound; and
(D) a melamine resin.

The inventors of the present invention conducted intensive studies to provide a hose which is superior in gas barrier properties, light in weight and less costly. The inventors initially came up with an idea to employ a hose of a laminated structure comprising a rubber layer and a metal foil laminate rather than the conventional metal tube for weight reduction, and focused attention on an ethylene-propylene-diene terpolymer (hereinafter abbreviated as "EPDM") and an ethylene-propylene copolymer (hereinafter abbreviated as "EPM") which are less costly as the material for the rubber layer. The inventors prototyped the hose by bonding the rubber layer and the metal foil laminate with an adhesive, but found that the adhesion between the rubber layer and the metal foil laminate was insufficient due to uneven application of the adhesive. With the need for an adhesive application step, the production process is complicated and more costly. In addition, consideration should be given to the pot life and concentration control of the adhesive, making it difficult to ensure stable production. Further, the production process presents a problem associated with environmental pollution because an organic solvent such as toluene is employed as a thinner for the adhesive.

To this end, the inventors further conducted studies to increase the adhesion between the rubber layer and the metal foil laminate of the hose without the application of the adhesive in an interface between the rubber layer and the metal foil laminate, and came up with an idea to mix an adhesive component with the aforesaid specific rubber material. As a result of further research and development on an adhesive component which imparts the specific rubber material with excellent adhesiveness, the inventors have found that a rubber layer produced by mixing a specific adhesive component (a resorcinol compound and a melamine resin) with the specific rubber material and vulcanizing the resulting rubber composition with the use of a peroxide vulcanizing agent has excellent adhesion to the metal foil laminate, and achieved the present invention.

A reason why the rubber layer composed of the aforesaid specific rubber composition has excellent adhesion to the laminate is believed to be as follows. The resorcinol compound mainly functions as an adhesive, and the melamine resin mainly functions as an auxiliary adhesive agent. More specifically, the melamine resin donates $CH_2O$ to the resorcinol compound, which in turn forms covalent bonds with a resin (e.g., a polyamide resin) in the laminate thereby to improve the adhesion. For example, the melamine resin donates $CH_2O$ to a resorcinol compound represented by the following formula (C) to provide a compound represented by the following formula (C'), which in turn forms covalent bonds with polyamide linkages (—CONH—) of the polyamide resin in the laminate to ensure firm adhesion. In addition, hydroxyl groups of the resorcinol compound partly serve for hydrogen bonding with the polyamide groups in the polyamide resin. It is supposed that the hydrogen bonding also contributes to the improvement of the adhesive effect.

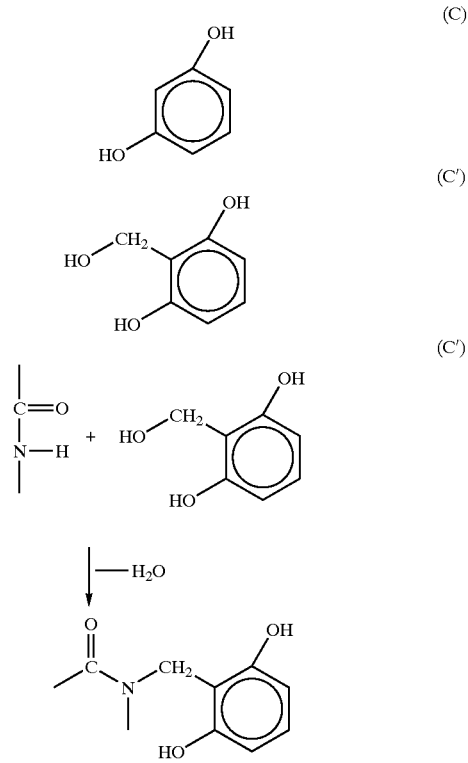

DESCRIPTION OF THE PREFERRED EMBODIMENTS

Embodiments of the present invention will hereinafter be described in detail.

Figure 1:
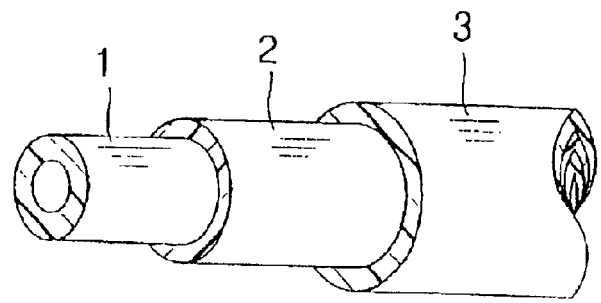
FIG. 1 is a sectional perspective view illustrating an exemplary hose according to the present invention.

An inventive hose includes, for example, an inner rubber layer 1 of a specific rubber composition, a laminate 2 provided on an outer peripheral surface of the rubber layer 1, and an outer rubber layer 3 of the same specific rubber composition provided on an outer peripheral surface of the laminate 2 as shown in FIG. 1. The laminate 2 includes at least one resin layer and a metal foil.

The rubber composition as a material for the rubber layers 1 and 3 comprises: (A) a specific rubber; (B) a peroxide vulcanizing agent; (C) a resorcinol compound; and (D) a melamine resin.

At least one of an ethylene-propylene-diene terpolymer (EPDM) and an ethylene-propylene copolymer (EPM) is employed as the specific rubber (A). The EPDM is not particularly limited as long as it is generally used as a base material for rubber compositions. However, it is preferred that the EPDM has an iodine value of 6 to 30, particularly 10 to 24, and an ethylene ratio of 48 to 70 wt %, particularly 50 to 60 wt % of the specific rubber (A).

A diene monomer (third component) in the EPDM is not particularly limited, but preferably is a diene monomer having a carbon number of 5 to 20. Specific examples of the diene monomer include 1,4-pentadiene, 1,4-hexadiene, 1,5-hexadiene, 2,5-dimethyl-1,5-hexadiene, 1,4-octadiene, 1,4-cyclohexadiene, cyclooctadiene, dicyclopentadiene (DCP), 5-ethylidene-2-norbornene (ENB), 5-butylidene-2-norbornene, 2-methallyl-5-norbornene and 2-isopropenyl-5-norbornene. Among these diene monomers (third component), dicyclopentadiene (DCP) and 5-ethylidene-2-norbornene (ENB) are particularly preferred.

Examples of the peroxide vulcanizing agent (B) to be used in combination with the specific rubber (A) include 2,4-dichlorobenzoyl peroxide, benzoyl peroxide, 1,1-di-t-butylperoxy-3,3,5-trimethylcyclohexane, 2,5-dimethyl-2,5-dibenzoylperoxyhexane, n-butyl-4,4'-di-t-butylperoxyvalerate, dicumyl peroxide, t-butylperoxybenzoate, di-t-butylperoxy-diisopropylbenzene, t-butylcumyl peroxide, 2,5-dimethyl-2,5-di-t-butylperoxyhexane, di-t-butyl peroxide and 2,5-dimethyl-2,5-di-t-butylperoxyhex-3-yne, which may be used either alone or in combination. Among these peroxide vulcanizing agents, di-t-butylperoxy-diisopropylbenzene is particularly preferred, because it is free from a problem associated with smell.

The peroxide vulcanizing agent (B) is preferably present in the rubber composition in a proportion of 1.5 to 20 parts by weight (hereinafter referred to simply as "parts") based on 100 parts of the rubber (A). If the proportion of the component (B) is smaller than 1.5 parts, the resulting hose tends to have a lower strength because of insufficient crosslinking of the rubber. If the proportion of the component (B) is greater than 20 parts, the resulting hose tends to have a poorer flexibility with a higher hardness of the rubber.

The resorcinol compound (C) to be used in combination with the components (A) and (B) is not particularly limited, as long as it serves as an adhesive. Examples of the resorcinol compound include modified resorcin-formaldehyde resins, resorcin and resorcin-formaldehyde (RF) resins, which may be used either alone or in combination. Among these resorcinol compounds, the modified resorcin-formaldehyde resins are particularly preferred in terms of evaporability, moisture absorption and compatibility with the rubber.

Examples of the modified resorcin-formaldehyde resins include resins represented by the following general formulae (1) to (3), among which resins represented by the general formula (1) are particularly preferred.

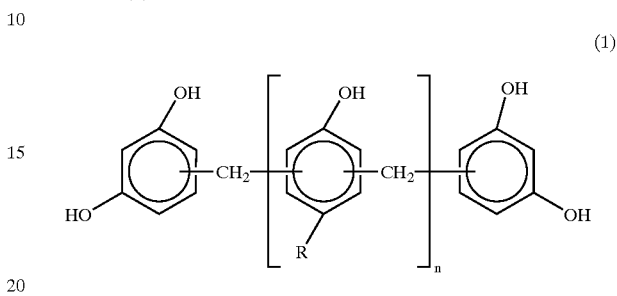

(1)

(wherein R is a hydrocarbon group, and n is a positive number)

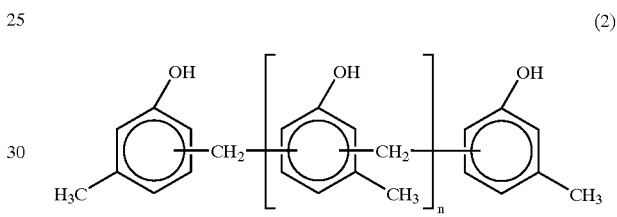

(2)

(wherein n is a positive number)

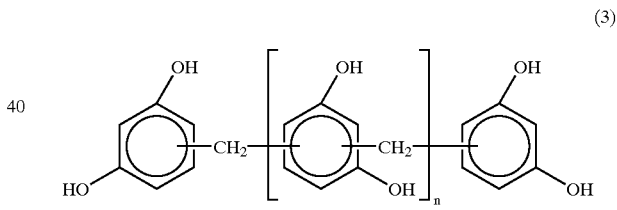

(3)

(wherein n is a positive number)

The resorcinol compound (C) is preferably present in the rubber composition in a proportion of 0.1 to 10 parts, particularly preferably 0.5 to 5 parts, based on 100 parts of the rubber (A). If the proportion of the component (C) is smaller than 0.1 part, the resulting rubber layer tends to have poorer adhesion to the laminate. On the other hand, if the proportion of the component (C) is greater than 10 parts, the cost is increased.

The melamine resin (D) to be used in combination with the components (A) to (C) is not particularly limited, as long as it serves as an auxiliary adhesive agent. Examples of the melamine resin include methylated formaldehyde-melamine polymers and hexamethylenetetramine, which may be used either alone or in combination. Among these melamine resins, the methylated formaldehyde-melamine polymers are particularly preferred in terms of evaporability, moisture absorption and compatibility with the rubber.

Examples of the methylated formaldehyde-melamine polymers include polymers represented by the following general formula (4).

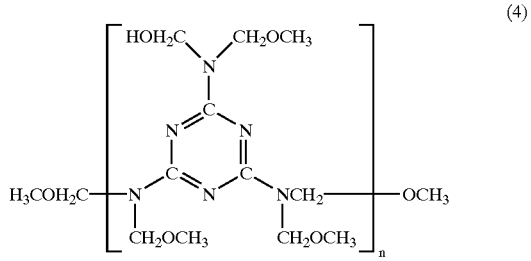

(4)

(wherein n is a positive number)

A mixture of the methylated formaldehyde-melamine polymers represented by the general formula (4) is preferably used as the melamine resin (D). It is particularly preferred that the mixture contains methylated formaldehyde-melamine polymers of the general formula (4) wherein n=1, n=2 and n=3 in proportions of 43 to 44 wt %, 27 to 30 wt % and 26 to 30 wt %, respectively.

The resorcinol compound (C) and the melamine resin (D) are preferably present in the rubber composition in a weight ratio of C/D=1/0.5 to 1/2, particularly preferably C/D=1/0.77 to 1/1.5. If the weight ratio of the component (D) is lower than 0.5, the resulting rubber layer has slightly deteriorated steady-state properties with a lower tensile strength (TB) and a lower extensibility (EB). Even if the weight ratio of the component (D) is higher than 2, the adhesion property plateaus with a constant adhesion strength. Therefore, further increase in the weight ratio of the component (D) leads to a cost increase with no additional effect.

In addition to the aforesaid components (A) to (D), carbon black, a process oil and the like are preferably blended in the rubber composition.

In addition to the aforesaid components, any of various additives such as an anti-aging agent, a processing aid, a crosslinking accelerator, a white filler, a reactive monomer and a foaming agent may be blended in the rubber composition, as required.

The rubber composition can be prepared by mixing the components (A) to (D) and, as required, any of the aforesaid additional components, and kneading the resulting mixture by means of a kneading machine such as a roll mill, a kneader or a Banbury mixer.

A resin material for the resin layer of the laminate 2 is not particularly limited, but examples thereof include polyamide resins and ethylene-vinyl alcohol copolymer (EVOH), which may be used either alone or in combination.

The polyamide resin is not particularly limited as long as it is a polymer having a polyamide linkage (—CONH—) in its recurring unit. The following are exemplary polyamides which are classified according to polymerization method.

(1) Polyamides produced by polycondensation of a diamine and a dibasic acid. Examples of the diamine include aliphatic, alicyclic and aromatic diamines such as hexamethylenediamine, decamethylenediamine, dodecamethylenediamine, 2,2,4- or 2,4,4-trimethylhexamethylenediamine, 1,3- or 1,4-bis(aminomethyl)cyclohexane, bis(p-aminocyclohexylmethane) and m- or p-xylylenediamine. Examples of the dibasic acid include aliphatic, alicyclic and aromatic dicarboxylic acids such as adipic acid, suberic acid, cebacic acid, cyclohexanedicarboxylic acid, terephthalic acid and isophthalic acid.

(2) Crystalline and amorphous polyamides produced by polycondensation of an aminocarboxylic acid. Examples of the aminocarboxylic acid include 6-aminocaproic acid, 11-aminoundecanoic acid and 12-aminododecanoic acid.

(3) Polyamides produced by ring opening polymerization of a lactam. Examples of the lactam include ε-caprolactam and ω-dodecalactam.

Besides the aforesaid polyamides, polyamide copolymers and mixtures of polyamides are usable as the polyamide resin to be used in the present invention. More specific examples of the polyamide resin include nylon 6, nylon 66, nylon 610, nylon 612, nylon 11, nylon 12, aromatic nylons and amorphous nylons, among which nylon 6 and nylon 66 are particularly preferred because of their high rigidity and heat resistance.

The EVOH is not particularly limited, but an EVOH having a melt flow rate (MFR which is equivalent to a melt flow index specified by JIS) of 1 to 10 g/10 minutes, preferably 1 to 6 g/10 minutes, as measured at 190° C. with a load of 2.16 kg in conformity with ASTM D 1238 is typically used.

The metal foil of the laminate 2 is not particularly limited, but examples thereof include metal foils composed of iron, iron alloys (e.g., SUS), copper, titanium, silver, nickel, nickel alloys and aluminum, which may be used either alone or in combination. The aluminum foil may be composed of either aluminum metal or an aluminum alloy. Among these metal foils, the SUS foil and the aluminum foil are particularly preferred because of their excellent gas resistance.

The structure of the laminate 2 is not particularly limited, as long as the metal foil and a film of the resin are laminated with the use of an adhesive. For example, the laminate 2 has a double layer structure having a metal foil and a resin film (metal foil/resin film), or a triple layer structure having a metal foil as a core and films of the resin provided on opposite surfaces of the metal foil (resin film/metal foil/resin film). The adhesive is not particularly limited, but any adhesives typically used in a laminating process are usable.

Specific examples of the laminate 2 include a laminate of triple layer structure with an SUS foil as a core sandwiched between polyamide (PA) resin films (PA resin film/SUS foil/PA resin film), a laminate of triple layer structure with an SUS foil as a core sandwiched between EVOH films (EVOH film/SUS foil/EVOH film), and a laminate of five layer structure having an SUS foil as a core, EVOH films provided on opposite surfaces of the SUS foil, and PA resin films provided on opposite surfaces of the EVOH films (PA resin film/EVOH film/SUS foil/EVOH film/PA resin film).

Other specific examples of the laminate 2 include a laminate of triple layer structure with an aluminum foil as a core sandwiched between polyamide (PA) resin films (PA resin film/aluminum foil/PA resin film), a laminate of triple layer structure with an aluminum foil as a core sandwiched between EVOH films (EVOH film/aluminum foil/EVOH film), and a laminate of five layer structure having an aluminum foil as a core, EVOH films provided on opposite surfaces of the aluminum foil, and PA resin films provided on opposite surfaces of the EVOH films (PA resin film/EVOH film/aluminum foil/EVOH film/PA resin film).

The hose shown in FIG. 1 is produced, for example, in the following manner. First, the aforesaid rubber composition is extruded around a mandrel for formation of an unvulcanized rubber layer 1, and then the metal foil and the resin film(s) are wrapped on the outer peripheral surface of the unvulcanized rubber layer for formation of the laminate 2. In turn, the rubber composition is extruded on the laminate 2 for formation of outer unvulcanized rubber layer 3. The resulting hose structure is entirely subjected to a vulcanizing process, and then the mandrel is removed. Thus, the hose (see FIG. 1) is provided, which includes the inner rubber layer 1, the laminate 2 provided on the outer peripheral surface of the rubber layer 1, and the outer rubber layer 3 provided on the outer peripheral surface of the laminate 2.

In the hose thus, produced, the rubber layers 1 and 3 typically each have a thickness of 0.5 to 4 mm, preferably 1 to 3 mm, and the laminate 2 typically has a total thickness of 8 µm to 0.4 mm, preferably 15 µm to 0.3 mm in consideration of a balance between the flexibility and the gas barrier properties, depending on the application of the hose. The hose typically has an inner diameter of 2 to 40 mm, preferably 4 to 35 mm, depending on the application of the hose.

The structure of the hose is not limited to that shown in FIG. 1, as long as the hose has a laminate structure including at least one rubber layer and a laminate. For example, the hose may have a double layer structure including a single rubber layer and a laminate. Further, it is not critical whether the rubber layer and the laminate serves as an inner layer.

In the present invention, a reinforcing layer may be provided on an outer peripheral surface of the outer rubber layer 3, and an ordinary rubber layer also may be provided on an outer peripheral surface of the reinforcing layer.

Exemplary materials for the reinforcing layer include polyvinyl alcohol (vinylon) filaments, polyamide (nylon) filaments, aramide filaments, polyethylene terephthalate (PET) filaments and wires.

Exemplary materials for the ordinary rubber layer include general-purpose rubbers such as EPDM, butyl rubber (IIR), halogenated butyl rubber (Cl-IIR, Br-IIR), isoprene rubber (IR), urethane rubber, chloroprene rubber (CR), epichlorohydrin rubber (ECO) and fluororubber, among which EPDM is particularly preferred because it is less costly.

With the arrangement of the respective layers of the inventive hose properly selected, the invention is applicable to a hose (methanol fuel hose or hydrogen fuel hose) for a fuel cell vehicle, a hose for transporting coolant in an air conditioner, a hose for an engine cooling system in a motor vehicle such as an automobile (e.g., a radiator hose for connection between an engine and a radiator, or a heater hose for connection between an engine and a heater core), and an automobile hose such as a gasoline fuel hose. Where the inventive hose is employed as the gasoline fuel hose, the rubber layer of the rubber composition is preferably provided as a layer (e.g., outer layer) other than the innermost layer, because EPDM has a relatively poor gasoline resistance.

Next, an explanation will be given to examples and comparative examples.

Prior to the explanation of the examples and the comparative examples, the components employed in these examples will be explained below.

Rubber (A)-1
  EPDM (ESPRENE 501A available from Sumitomo Chemical Co., Ltd., and having an iodine value of 12, an ethylene ratio of 50 wt % and a Mooney viscosity (ML1+4 100° C.) of 43)
Rubber (A)-2
  EPM (ESPRENE 201 available from Sumitomo Chemical Co., Ltd.)
Peroxide Vulcanizing Agent (B)
  Di-t-butylperoxy-diisopropylbenzene (PEROXIMON F-40 available from Nihon Yushi Co., Ltd.)
Resorcinol Compound (C)
  Modified resorcin-formaldehyde resin represented by the general formula (1) (SUMICANOL 620 available from Sumitomo Chemical Co., Ltd.)
Melamine Resin (D)
  Methylated formaldehyde-melamine polymer (SUMICANOL 507A available from Sumitomo Chemical Co., Ltd.)
Carbon Black
  CEAST SO available from Tokai Carbon Co.
Process Oil
  DIANAPROCESS PW-380 available from Idemitsu Kosan Co., Ltd.
Vulcanization Accelerator 1
  Tetramethylthiuram disulfide (SANCELER TT available from Sanshin Chemical Co., Ltd.)
Vulcanization Accelerator 2
  Zinc dimethyldithiocarbamate (SANCELER PZ available from Sanshin Chemical Co., Ltd.)
Vulcanization Accelerator 3
  Mercaptobenzothiazole (SANCELER M available from Sanshin Chemical Co., Ltd.)
Vulcanizing Agent
  Sulfur

EXAMPLE 1

Preparation of Rubber Composition

First, 100 parts of the above EPDM, 4.2 parts of the above peroxide vulcanizing agent, 1 part of the above resorcinol compound, 0.77 parts of the above melamine resin, 100 parts of the above carbon black and 60 parts of the above process oil were blended, and then the resulting mixture was kneaded by means of a roll mill for preparation of a rubber composition.

Production of Hose

The rubber composition thus prepared was extruded around a mandrel for formation of an unvulcanized rubber layer, and then a laminate film (PA6 film/SUS foil/PA6 film) having a total thickness of 70 µm was wrapped on an outer peripheral surface of the unvulcanized rubber layer for formation of a laminate. Then, the rubber composition was extruded on an outer peripheral surface of the laminate. After the resulting hose structure was entirely subjected to a vulcanizing process at 160° C. for 45 minutes, the mandrel was removed. Thus, a hose (see FIG. 1) was produced, which included a rubber layer (having a thickness of 2 mm), the laminate (having a thickness of 70 µm) provided on the outer peripheral surface of the rubber layer, and another rubber layer (having a thickness of 2 mm) provided on the outer peripheral surface of the laminate.

EXAMPLES 2 TO 12 AND COMPARATIVE EXAMPLES 1 TO 4

Hoses were produced in substantially the same manner as in Example 1, except that rubber layer materials and laminate materials shown in Tables 1 to 3 were employed.

EXAMPLE 13

Preparation of Rubber Composition

First, 100 parts of the above EPDM, 4.2 parts of the above peroxide vulcanizing agent, 1 part of the above resorcinol compound, 0.77 parts of the above melamine resin, 100 parts of the above carbon black and 60 parts of the above process oil were blended, and then the resulting mixture was kneaded by means of a roll mill for preparation of a rubber composition.

Production of Hose

The rubber composition thus prepared was extruded around a mandrel for formation of an unvulcanized rubber layer, and then a laminate film (PA6 film/aluminum foil/PA6 film) having a total thickness of 70 µm was wrapped on an outer peripheral surface of the unvulcanized rubber layer for formation of a laminate. Then, the rubber composition was extruded on an outer peripheral surface of the laminate. After the resulting hose structure was entirely subjected to a vulcanizing process at 160° C. for 45 minutes, the mandrel was removed. Thus, a hose (see FIG. 1) was produced, which included a rubber layer (having a thickness of 2 mm), the laminate (having a thickness of 70 μm) provided on the outer peripheral surface of the rubber layer, and another rubber layer (having a thickness of 2 mm) provided on the outer peripheral surface of the laminate.

EXAMPLES 14 TO 21 AND COMPARATIVE EXAMPLES 5 TO 8

Hoses were produced in substantially the same manner as in Example 13, except that rubber layer materials and laminate materials shown in Tables 4 to 6 were employed.

Properties of the hoses thus produced in accordance with the examples and the comparative examples were evaluated in the following manners. The results of the evaluations are shown in Tables 1 to 6.

Tensile Strength (TB) and Extension (EB)

The rubber compositions were each press-vulcanized at 160° C. for 45 minutes for preparation of a vulcanized rubber sheet having a thickness of 2 mm, and then stamped to provide a JIS No.5 dumbbell specimen. The tensile strength (TB) and extension (EB) of the specimen were determined in conformity with Japanese Industrial Standard K 6251 (hereinafter Japanese Industrial Standard abbreviated as "JIS").

Adhesion Property

A specimen (having a width of 20 mm and a length of 100 mm) for evaluation of adhesion properties was cut out of each of the hoses. The specimen was mounted on a tensile tester (JIS B 7721), and pulled from a laminate side thereof at a rate of 50 mm/min with the inner rubber layer fixed to the tester for the evaluation of the adhesion property (kg/25 mm). Further, a broken state of the rubber layer and the laminate was visually observed. For the evaluation of the broken state in Tables 1 to 6, a symbol ○ indicates that the rubber layer was broken, and a symbol X indicates that interfacial separation occurred.

Gas Barrier Property

Figure 2:
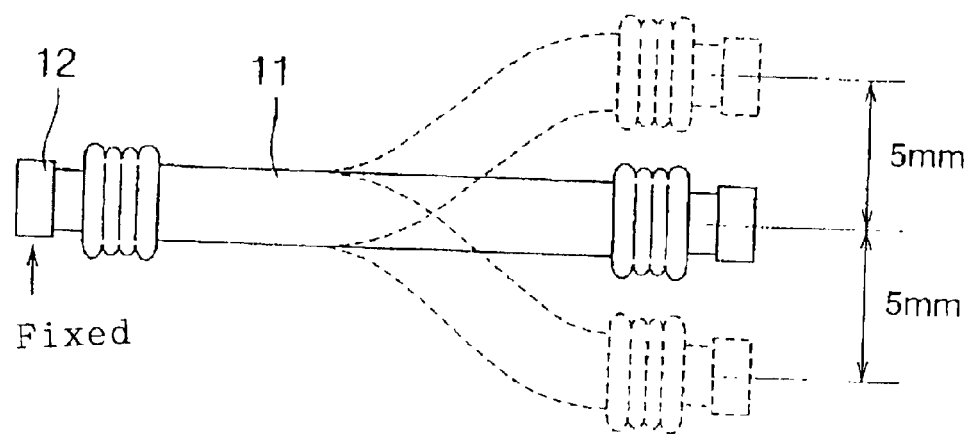
FIG. 2 is a diagram for explaining a whip test for evaluation of a gas barrier property.

The hoses were each subjected to a whip test. More specifically, the hose was cut to a test length (hose length) of 300 mm and, as shown in FIG. 2, the hose 11 was subjected to the whip test at a pressure of 3.5 MPa at a test temperature of 80° C. for 100 hours with an oscillation amplitude of ±5 mm with one end 12 thereof being fixed. After the whip test, the hose was filled with helium, and allowed to stand in an 80° C. atmosphere for 72 hours. Then, the weight of the hose was measured. The weight of the hose was compared with an initial weight of the hose measured when the hose was filled with helium before the whip test. For the evaluation of the gas barrier property in Tables 1 to 6, a symbol ○ indicates that there was no weight change, and a symbol X indicates that the hose weight measured after the whip test was smaller than the initial hose weight (the hose had greater permeability to helium).

TABLE 1

(Parts by weight)

| | Example | | | | | |
|---|---|---|---|---|---|---|
| | 1 | 2 | 3 | 4 | 5 | 6 |
| Rubber layer | | | | | | |
| EPDM | 100 | 100 | 100 | 100 | 100 | 100 |
| EPM | — | — | — | — | — | — |
| Peroxide vulcanizing agent | 4.2 | 4.2 | 4.2 | 4.2 | 4.2 | 4.2 |
| Resorcinol compound | 1 | 5 | 10 | 1 | 1 | 0.1 |
| Melamine resin | 0.77 | 3.85 | 3.85 | 0.5 | 2 | 0.05 |
| Carbon black | 100 | 100 | 100 | 100 | 100 | 100 |
| Process oil | 60 | 60 | 60 | 60 | 60 | 60 |
| Laminate | *1 | *1 | *1 | *1 | *1 | *1 |
| TB (MPa) | 13.0 | 10.5 | 8.2 | 13.0 | 11.0 | 13.8 |
| EB (%) | 250 | 250 | 230 | 250 | 250 | 260 |
| Adhesion (kg/25 mm) | 8.8 | 8.6 | 9.2 | 7.8 | 8.4 | 6.4 |
| Broken state | ○ | ○ | ○ | ○ | ○ | ○ |
| Gas barrier property | ○ | ○ | ○ | ○ | ○ | ○ |

*1: PA6 film/SUS foil/PA6 film (total thickness of 70 μm)

TABLE 2

(Parts by weight)

| | Example | | | | | |
|---|---|---|---|---|---|---|
| | 7 | 8 | 9 | 10 | 11 | 12 |
| Rubber layer | | | | | | |
| EPDM | — | 100 | 100 | 100 | 100 | 100 |
| EPM | 100 | — | — | — | — | — |
| Peroxide vulcanizing agent | 4.2 | 4.2 | 4.2 | 4.2 | 4.2 | 4.2 |
| Resorcinol compound | 1 | 1 | 1 | 1 | 1 | 1 |
| Melamine resin | 0.77 | 0.77 | 0.77 | 0.77 | 0.77 | 0.77 |
| Carbon black | 100 | 100 | 100 | 100 | 100 | 100 |
| Process oil | 60 | 60 | 60 | 60 | 60 | 60 |
| Laminate | *1 | *2 | *3 | *4 | *5 | *6 |
| TB (MPa) | 7.5 | 13.0 | 13.0 | 13.0 | 13.0 | 13.0 |
| EB (%) | 450 | 250 | 250 | 250 | 250 | 250 |
| Adhesion (kg/25 mm) | 8.5 | 7.5 | 8.8 | 8.8 | 9.0 | 9.0 |
| Broken state | ○ | ○ | ○ | ○ | ○ | ○ |
| Gas barrier Property | ○ | ○ | ○ | ○ | ○ | ○ |

*1: PA6 film/SUS foil/PA6 film (total thickness of 70 μm)
*2: EVOH film/SUS foil/EVOH film (total thickness of 50 μm)
*3: PA6 film/copper foil/PA6 film (total thickness of 70 μm)
*4: PA6 film/titanium foil/PA6 film (total thickness of 70 μm)
*5: PA6 film/EVOH film/SUS foil/EVOH film/PA6 film (total thickness of 100 μm)
*6: PA6 film/EVOH film/copper foil/EVOH film/PA6 film (total thickness of 100 μm)

TABLE 3

(Parts by weight)

| | Comparative Example | | | |
|---|---|---|---|---|
| | 1 | 2 | 3 | 4 |
| Rubber layer | | | | |
| EPDM | 100 | 100 | 100 | 100 |
| Peroxide vulcanizing agent | 4.2 | 4.2 | 4.2 | — |
| Resorcinol compound | — | 1 | — | 1 |

TABLE 3-continued (Parts by weight)

| | Comparative Example | | | |
|---|---|---|---|---|
| | 1 | 2 | 3 | 4 |
| Melamine resin | — | — | 1 | 0.77 |
| Carbon black | 100 | 100 | 100 | 100 |
| Process oil | 60 | 60 | 60 | 60 |
| Vulcanization accelerator 1 | — | — | — | 0.75 |
| Vulcanization accelerator 2 | — | — | — | 0.75 |
| Vulcanization accelerator 3 | — | — | — | 0.5 |
| Vulcanizing agent (sulfur) | — | — | — | 1.5 |
| Laminate | *1 | *1 | *1 | *1 |
| TB (MPa) | 14.0 | 13.0 | 14.0 | 13.3 |
| EB (%) | 260 | 300 | 270 | 500 |
| Adhesion (kg/25 mm) | 0.2 | 1.2 | 1.0 | 1.8 |
| Broken state | X | X | X | X |
| Gas barrier property | X | X | X | X |

*1: PA6 film/SUS foil/PA6 film (total thickness of 70 μm)

TABLE 4

(Parts by weight)

| | Example | | | | | |
|---|---|---|---|---|---|---|
| | 13 | 14 | 15 | 16 | 17 | 18 |
| Rubber layer | | | | | | |
| EPDM | 100 | 100 | 100 | 100 | 100 | 100 |
| EPM | — | — | — | — | — | — |
| Peroxide vulcanizing agent | 4.2 | 4.2 | 4.2 | 4.2 | 4.2 | 4.2 |
| Resorcinol compound | 1 | 5 | 10 | 1 | 1 | 0.1 |
| Melamine resin | 0.77 | 3.85 | 3.85 | 0.5 | 2 | 0.05 |
| Carbon black | 100 | 100 | 100 | 100 | 100 | 100 |
| Process oil | 60 | 60 | 60 | 60 | 60 | 60 |
| Laminate | *7 | *7 | *7 | *7 | *7 | *7 |
| TB (MPa) | 13.0 | 10.5 | 8.2 | 13.0 | 11.0 | 13.8 |
| EB (%) | 250 | 250 | 230 | 250 | 250 | 260 |
| Adhesion (kg/25 mm) | 8.8 | 8.6 | 9.2 | 7.8 | 8.4 | 6.4 |
| Broken state | ○ | ○ | ○ | ○ | ○ | ○ |
| Gas barrier property | ○ | ○ | ○ | ○ | ○ | ○ |

*7: PA6 film/aluminum foil/PA6 film (total thickness of 70 μm)

TABLE 5

(Parts by weight)

| | Example | | |
|---|---|---|---|
| | 19 | 20 | 21 |
| Rubber layer | | | |
| EPDM | — | 100 | 100 |
| EPM | 100 | — | — |
| Peroxide vulcanizing agent | 4.2 | 4.2 | 4.2 |
| Resorcinol compound | 1 | 1 | 1 |
| Melamine resin | 0.77 | 0.77 | 0.77 |
| Carbon black | 100 | 100 | 100 |
| Process oil | 60 | 60 | 60 |
| Laminate | *7 | *8 | *9 |
| TB (MPa) | 7.5 | 13.0 | 13.0 |
| EB (%) | 450 | 250 | 250 |
| Adhesion (kg/25 mm) | 8.5 | 7.5 | 9.0 |
| Broken state | ○ | ○ | ○ |
| Gas barrier property | ○ | ○ | ○ |

*7: PA6 film/aluminum foil/PA6 film (total thickness of 70 μm)
*8: EVOH film/aluminum foil/EVOH film (total thickness of 50 μm)
*9: PA6 film/EVOH film/aluminum foil/EVOH film/PA6 film (total thickness of 100 μm)

TABLE 6

(Parts by weight)

| | Comparative Example | | | |
|---|---|---|---|---|
| | 5 | 6 | 7 | 8 |
| Rubber layer | | | | |
| EPDM | 100 | 100 | 100 | 100 |
| Peroxide vulcanizing agent | 4.2 | 4.2 | 4.2 | — |
| Resorcinol compound | — | 1 | — | 1 |
| Melamine resin | — | — | 1 | 0.77 |
| Carbon black | 100 | 100 | 100 | 100 |
| Process oil | 60 | 60 | 60 | 60 |
| Vulcanization accelerator 1 | — | — | — | 0.75 |
| Vulcanization accelerator 2 | — | — | — | 0.75 |
| Vulcanization accelerator 3 | — | — | — | 0.5 |
| Vulcanizing agent (sulfur) | — | — | — | 1.5 |
| Laminate | *7 | *7 | *7 | *7 |
| TB (MPa) | 14.0 | 13.0 | 14.0 | 13.3 |
| EB (%) | 260 | 300 | 270 | 500 |
| Adhesion (kg/25 mm) | 0.2 | 1.2 | 1.0 | 1.8 |
| Broken state | X | X | X | X |
| Gas barrier property | X | X | X | X |

*7: PA6 film/aluminum foil/PA6 film (total thickness of 70 μm)

As can be understood from the results shown in Tables 1 to 6, the hoses of the examples each had superior adhesion between the rubber layer and the laminate, because the rubber layer was composed of the specific rubber composition prepared by employing a resorcinol compound and a melamine resin. Further, these hoses were excellent in gas barrier properties.

In contrast, the hoses of Comparative Examples 1 and 5 each had extremely poor adhesion between the rubber layer and the laminate, had poor gas barrier properties and suffered from interfacial separation, because the rubber layer was composed of the rubber composition containing neither the resorcinol compound nor the melamine resin. The hoses of Comparative Examples 2 and 6 each had extremely poor adhesion between the rubber layer and the laminate, had poor gas barrier properties and suffered from interfacial separation, because the rubber layer was composed of the rubber composition containing only the resorcinol compound but not the melamine resin. The hoses of Comparative Example 3 and 7 each had extremely poor adhesion between the rubber layer and the laminate, had poor gas barrier properties and suffered from interfacial separation, because the rubber layer was composed of the rubber composition containing only the melamine resin but not the resorcinol compound. The hoses of Comparative Examples 4 and 8 each had extremely poor adhesion between the rubber layer and the laminate, had poor gas barrier properties and suffered from interfacial separation, because the rubber layer was composed of the rubber composition containing a sulfur vulcanizing agent instead of a peroxide vulcanizing agent.

This is supposedly because the sulfur vulcanizing agent had a higher vulcanization rate than the peroxide vulcanizing agent, so that the rubber layer per se is vulcanized before the rubber layer is bonded to the laminate thereby to result in relatively poor adhesion.

As described above, the inventive hose has the laminate structure which comprises the rubber layer composed of the specific rubber composition, and the laminate comprising the metal foil and the resin. Therefore, the inventive hose is lighter in weight and less costly than a conventional metal tube. When the inventive hose is employed as an automotive hose (e.g., a hose for a fuel cell vehicle), the fuel efficiency is improved by weight reduction of the hose, and vibrations of the vehicle are absorbed by the rubber layer. In addition, excellent adhesion between the rubber layer and the laminate is ensured even without application of an adhesive in an interface between the rubber layer and the laminate, because the rubber layer per se has an adhesive property. Without the need for the adhesive applying step, there is no need to give consideration to the pot life and concentration control of the adhesive (in a so-called adhesiveless production process), so that a more stable production can be ensured. Without the use of an organic solvent as a thinner for the adhesive, there is no problem associated with environmental pollution. Since vulcanization is carried out by employing the peroxide vulcanizing agent instead of the conventional sulfur vulcanizing agent, there is no need to blend zinc oxide in the rubber composition (a zinc-free production process can be realized). Where the rubber layer serves as an inner layer of the hose, for example, the hose is free from clogging or leakage of liquid from a seal portion.

Where the resorcinol compound (c) and the melamine resin (D) are present in the rubber composition in a ratio within the predetermined range, the adhesion between the rubber layer and the laminate is further improved.

Where the resorcinol compound (C) is present in the rubber composition in a proportion within the predetermined range based on the specific rubber (A), the adhesion between the rubber layer and the laminate is further improved.

What is claimed is:

1. A hose of a laminated structure which comprises a rubber layer composed of a rubber composition, and a laminate comprising a metal foil and a resin, the rubber composition comprising:

(A) a rubber comprising at least one of an ethylene-propylene-diene terpolymer and an ethylene-propylene copolymer;
   (B) a peroxide vulcanizing agent;
   (C) a resorcinol compound selected from the group consisting of those represented by the general formulae (1) to (3),

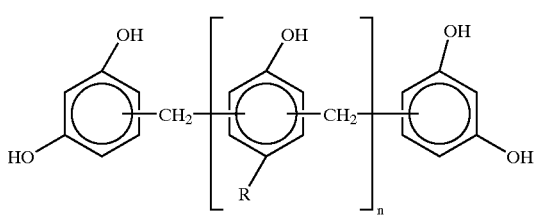

(1)

(wherein R is a hydrocarbon group, and n is a positive number);

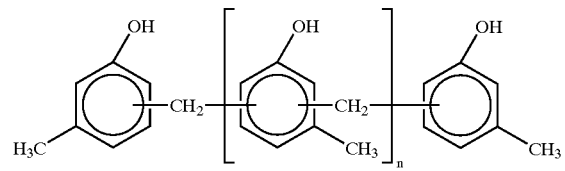

(2)

(wherein n is a positive number);

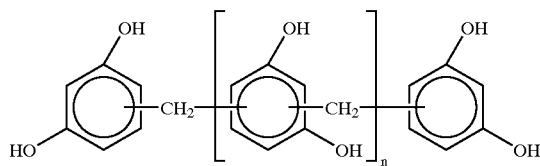

(3)

(wherein n is a positive number); and
   (D) a melamine resin.

2. A hose as set forth in claim 1, wherein the resin of the laminate comprises at least one of a polyamide resin and an ethylene-vinyl alcohol copolymer.

3. A hose as set forth in claim 2, wherein the metal foil is at least one metal foil selected from the group consisting of an iron foil, an iron alloy foil, a copper foil, a titanium foil, a silver foil, a nickel foil and an aluminum foil.

4. A hose as set forth in claim 3, wherein the components (C) and (D) are present in the rubber composition in a weight ratio of (C)/(D)=1/0.5 to 1/2.

5. A hose as set forth in claim 4, wherein the component (C) is present in the rubber composition in a proportion of 0.1 to 10 parts by weight based on 100 parts by weight of the component (A).

6. A hose as set forth in claim 3, wherein the component (C) is present in the rubber composition in a proportion of 0.1 to 10 parts by weight based on 100 parts by weight of the component (A).

7. A hose as set forth in claim 2, wherein the components (C) and (D) are present in the rubber composition in a weight ratio of (C)/(D)=1/0.5 to 1/2.

8. A hose as set forth in claim 7, wherein the component (C) is present in the rubber composition in a proportion of 0.1 to 10 parts by weight based on 100 parts by weight of the component (A).

9. A hose as set forth in claim 2, wherein the component (C) is present in the rubber composition in a proportion of 0.1 to 10 parts by weight based on 100 parts by weight of the component (A).

10. A hose as set forth in claim 1, wherein the metal foil is at least one metal foil selected from the group consisting of an iron foil, an iron alloy foil, a copper foil, a titanium foil, a silver foil, a nickel foil and an aluminum foil.

11. A hose as set forth in claim 10, wherein the components (C) and (D) are present in the rubber composition in a weight ratio of (C)/(D)=1/0.5 to 1/2.

12. A hose as set forth in claim 11, wherein the component (C) is present in the rubber composition in a proportion of 0.1 to 10 parts by weight based on 100 parts by weight of the component (A).

13. A hose as set forth in claim 10, wherein the component (C) is present in the rubber composition in a proportion of 0.1 to 10 parts by weight based on 100 parts by weight of the component (A).

14. A hose as set forth in claim 1, wherein the components (C) and (D) are present in the rubber composition in a weight ratio of (C)/(D)=1/0.5 to 1/2.

15. A hose as set forth in claim 14, wherein the component (C) is in the rubber composition in a proportion of 0.1 to 10 parts by weight based on 100 parts by weight of the component (A).

16. A hose as set forth in claim 1, wherein the component (C) is present in the rubber composition in a proportion of 0.1 to 10 parts by weight based on 100 parts by weight of the component (A).

17. A hose as set forth in claim 1, wherein the melamine resin of the component (D) is the methylated formaldehyde-melamine polymer represented by the following general formula (4),

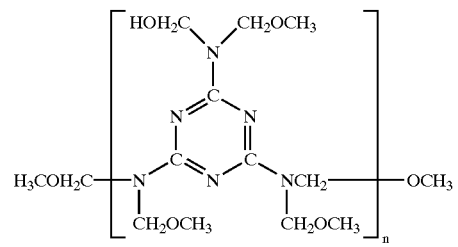

(wherein n is a positive number).

* * * * *